(12) United States Patent
Leclercq et al.

(10) Patent No.: US 9,108,179 B2
(45) Date of Patent: Aug. 18, 2015

(54) COLUMN WITH HEAT AND/OR MATERIAL EXCHANGE PACKING

(75) Inventors: Francois Leclercq, Lyons (FR); Frederic Rousseau, Fontenay le Fleury (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1086 days.

(21) Appl. No.: 12/935,929

(22) PCT Filed: Apr. 7, 2009

(86) PCT No.: PCT/FR2009/050596
§ 371 (c)(1),
(2), (4) Date: Oct. 1, 2010

(87) PCT Pub. No.: WO2009/136061
PCT Pub. Date: Nov. 12, 2009

(65) Prior Publication Data
US 2011/0023542 A1    Feb. 3, 2011

(30) Foreign Application Priority Data

Apr. 7, 2008    (FR) ..................................... 08 52300

(51) Int. Cl.
*F25J 3/00* (2006.01)
*B01J 19/32* (2006.01)
*F25J 3/04* (2006.01)

(52) U.S. Cl.
CPC .............. *B01J 19/32* (2013.01); *F25J 3/04412* (2013.01); *F25J 3/04909* (2013.01);
(Continued)

(58) Field of Classification Search
CPC ................ F25J 3/04909; F25J 3/04921; B01J 2219/32234; B01J 2219/32408; B01J 2219/32213; B01J 2219/3221; B01J 2219/32272; B01J 19/32
USPC ................ 62/643–656, 905, 906; 261/94, 97; 202/234; 210/175, 635; 428/218; 203/41
See application file for complete search history.

(56) References Cited

U.S. PATENT DOCUMENTS 4,296,050 A * 10/1981 Meier ......................... 261/112.2
5,092,132 A *  3/1992 Marshall et al. ................ 62/646
(Continued)

FOREIGN PATENT DOCUMENTS

CA          1095827         2/1981
EP          0491591         6/1992
(Continued)

OTHER PUBLICATIONS

International Search Report for PCT/FR2009/050596.
(Continued)

*Primary Examiner* — Frantz Jules
*Assistant Examiner* — Emmanuel Duke
(74) *Attorney, Agent, or Firm* — Justin K. Murray

(57) ABSTRACT

A column with exchange packing for the exchange of heat and/or of material between a descending liquid and an ascending gas, of the type comprising at least one exchange section comprising several superposed portions of packing, either defined between two liquid distributors or defined between a fluid inlet or outlet and a liquid distributor or between a first fluid inlet or outlet and a second fluid inlet or outlet or comprising a minimum of 2 packing modules and a maximum of 20 packing modules that are superposed, preferably directly, on one another, this exchange section comprising a lower portion and, above that, another portion. It applies particularly to air distillation columns is presented.

16 Claims, 2 Drawing Sheets

(52) U.S. Cl.
CPC ..... *F25J 3/04921* (2013.01); *B01J 2219/3221* (2013.01); *B01J 2219/32213* (2013.01); *B01J 2219/32234* (2013.01); *B01J 2219/32272* (2013.01); *B01J 2219/32408* (2013.01)

(56) References Cited

U.S. PATENT DOCUMENTS

| | | | | |
|---|---|---|---|---|
| 5,139,544 | A * | 8/1992 | Lucero et al. | 95/211 |
| 5,224,351 | A * | 7/1993 | Jeannot et al. | 62/643 |
| 5,237,823 | A * | 8/1993 | Cheung et al. | 62/643 |
| 5,339,648 | A * | 8/1994 | Lockett et al. | 62/643 |
| 5,419,136 | A * | 5/1995 | McKeigue | 62/645 |
| 5,644,932 | A * | 7/1997 | Dunbobbin et al. | 62/640 |
| 5,901,575 | A * | 5/1999 | Sunder | 62/643 |
| 6,427,985 | B1 * | 8/2002 | Kaibel et al. | 261/112.2 |
| 6,672,572 | B2 * | 1/2004 | Werlen | 261/94 |
| 7,052,000 | B2 * | 5/2006 | Zich et al. | 261/97 |
| 2004/0150123 | A1 * | 8/2004 | Strofer et al. | 261/95 |

FOREIGN PATENT DOCUMENTS

| | | |
|---|---|---|
| EP | 0644389 | 3/1995 |
| EP | 0845293 | 6/1998 |
| EP | 1166868 | 1/2002 |
| EP | 1186843 | 3/2002 |
| FR | 2827526 | 1/2003 |
| GB | 1004046 | 9/1965 |
| WO | 86/06296 | 11/1986 |
| WO | 90/10497 | 9/1990 |

OTHER PUBLICATIONS

Anonymous, "Structured Packings for Distillation, Absorption and Reactive Distillation" Internet Article, May 27, 2008, XPOO2505459, URL: http://www.sulzerchemtech.com/en/Porta1Data/11/Resources/brochures/mtc/StructuredPackings.pdf.

* cited by examiner

COLUMN WITH HEAT AND/OR MATERIAL EXCHANGE PACKING

This application is a §371 of International PCT Application PCT/FR2009/050596, filed Apr. 7, 2009.

FIELD OF THE INVENTION

The present invention relates to a column with exchange packing for the exchange of heat and/or of material between a descending liquid and an ascending gas, of the type comprising at least one exchange section comprising several superposed portions of packing, either defined between two liquid distributors or defined between a fluid inlet or outlet and a liquid distributor or between a first fluid inlet or outlet and a second fluid inlet or outlet or comprising a minimum of 2 packing modules and a maximum of 20 packing modules that are superposed, preferably directly, on one another, this exchange section comprising a lower portion and, above that, another portion. It applies particularly to air distillation columns.

What is meant here by packing is a device intended to bring a descending liquid and an ascending gas into intimate contact with one another in order that an exchange of heat and/or of material can take place.

BACKGROUND

The packing portions each consist of at least one packing module or "pack". These modules may be of the loose type, that is to say each made up of a volume of discrete particles, but are preferably of a type known as structured. This category particularly includes:

SUMMARY OF THE INVENTION (1) Cross-corrugated packings, generally consisting of corrugated strips comprising alternating parallel corrugations each arranged in a vertical general plane and against one another, the corrugations running obliquely and downward in opposite directions from one strip to the next. A level of perforation typically of around 10% is generally provided in these packings of the cross-corrugated type.

GB-A-1 004 046 discloses packings of the cross-corrugated type, and CA-A-1 095 827 proposes an improvement to this type of packing by adding dense small-diameter perforations to allow the liquid to pass right through the cross-corrugated strips.

Such packing is generally manufactured from a flat product, namely from metal sheets in strip form. The strips are first of all bent (or curved) to form a kind of corrugated sheet in strip form, in which the corrugations are oblique with respect to the axis of the strip. The bent strips are then cut into portions then stacked, inverting every alternate strip, to form modules or "packs".

(2) Vented packings, in which each module comprises a plurality of baffles which define a set of horizontal layers of fixed blowers which agitate the ascending gas.

These vented packings are structures that have a three-dimensional effect on the gas ascending the column. By causing multiple rotations of the gas, they introduce a great deal of turbulence into this gas, and the resultant agitation improves the exchange of heat and/or of material with the descending liquid.

Examples of such packing packs are described in WO-A-86/06 296, in WO-A-90/10 497 and in EP-A-0 845 293.

It is an object of the invention to reduce the cost of packing-type heat and/or material exchange columns.

To this end, the subject of the invention is a column with packing of the abovementioned type, characterized in that the lower packing portion of at least one exchange section comprises at least one packing module that has a lower number of transfer units than at least one packing module of the other packing portion of the same exchange section.

As is well known in the art, the number of vapor phase transfer units (NTU) of a packing module is the quotient of the height of the module (HM) divided by the height of a vapor phase transfer unit (HTU). The HTU is commonly used to characterize the intrinsic efficiency of a packing and is connected to the height equivalent to a theoretical plate (HETP) of this same packing by the following relationship:

$$HETP = HTU \cdot \frac{m \cdot V/L - 1}{\ln(m \cdot V/L)}$$

where L is the molar flow rate of the liquid (mol/s)

V is the molar flow rate of the vapor (mol/s)

m is the gradient of the equilibrium straight line in a diagram representing the mole fraction in the vapor as a function of the mole fraction in the liquid.

The HTU, and therefore the NTU, of a packing module are moderately dependent on the fluids distilled and on the distillation conditions. However, when this text compares the NTUs of two packing modules, it must always be inferred that these two modules are being considered under identical distillation conditions. In addition, for simplicity, the number of vapor phase transfer units will, in this text, be referred to as the number of transfer units.

The packing column according to the invention may have one or more of the following features, considered alone or in any technically feasible combination:

said module of said lower portion differs from said module of said other portion of the same exchange section in terms of at least one of the following factors:

its intrinsic density;

its structure;

the angle at which its channels are inclined with respect to the horizontal if the packing is a structured packing of the cross-corrugated type;

its mean density over the cross section of the column; and its height;

said factor is the mean density, and said lower portion occupies only a fraction of the cross section of the column, situated under the jets of liquid emanating from the portion above it;

said packing portions are portions of structured packing;

said lower packing portion is a portion of cross-corrugated packing, while the other packing portion is a portion of vented packing;

said lower packing portion is a cross-corrugated packing portion of relatively low density, while the other packing portion is a cross-corrugated packing portion of greater density, the packing modules being angularly offset, notably by 90°, from one another about the vertical central axis of the column;

said lower packing portion consists of a single packing module;

said single module is shorter in height than the modules of the other portion of the same exchange section;

in each exchange section, the packing modules are stacked on top of one another, directly or with the interposition of elements that form spacer pieces;

the column is the low-pressure column of a double air distillation column or an argon-enriched air gas mixture separation column;

the column comprises at least two sections one on top of the other, in which at least the upper section has a lower portion comprising at least one packing module that has a lower number of transfer units than at least one packing module of the other packing portion of the same exchange section and a space defined between the two sections, this space containing neither distributor nor inlet for fluid from the outside;

the two sections one on top of the other each comprise at least 2 modules, preferably at least 4 modules, or even at least 5 modules;

the section is contained between a fluid inlet or outlet and a liquid distributor, the section possibly comprising at least 2 portions and at most 20 portions that are superposed, preferably directly, on top of one another;

the section is contained between a first fluid inlet or outlet and a second fluid inlet or outlet, the section possibly comprising at least 2 portions and at most 20 portions that are superposed, preferably directly, on top of one another.

Another subject of the invention is a method of separating an air gas using a column as described hereinabove, in which the column operates at a pressure of below 4 bar abs.

Possibly, the column operates at a pressure of below 2 bar abs and/or constitutes the low-pressure column of a double column or an argon separation column fed with a flow of argon enriched air gas.

DETAILED DESCRIPTION OF THE INVENTION

Figure 1:
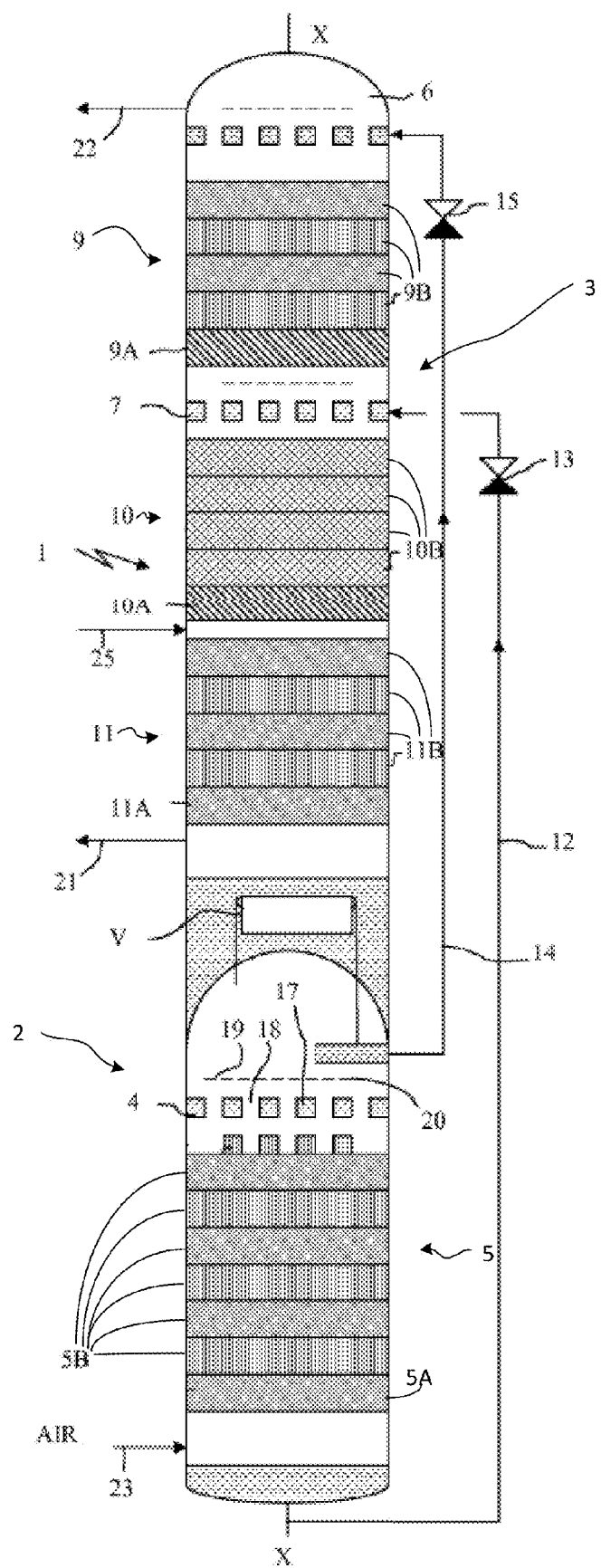
FIG. 1 illustrates a schematic axial cross section of a double air distillation column according to the invention.
Figure 2:
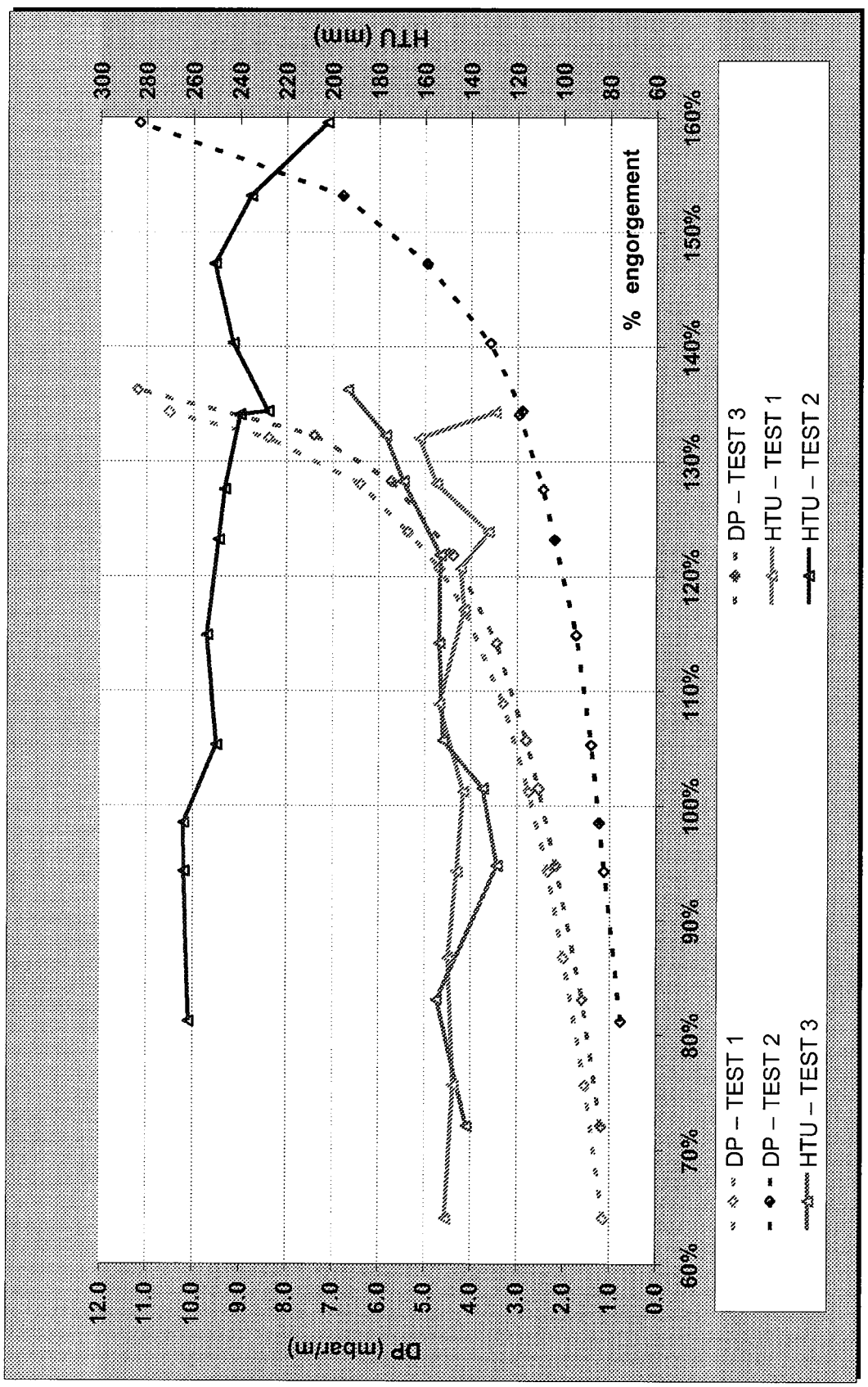
FIG. 2 is a graph depicting the variation in pressure drop and height per transfer unit for columns according to the prior art and a column according to the invention.

For a further understanding of the nature and objects for the present invention, reference should be made to the detailed description, taken in conjunction with the accompanying drawing, in which like elements are given the same or analogous reference numbers and wherein:

One exemplary embodiment of the invention will now be described with reference to the attached drawings of which FIG. 1 is a schematic axial cross section of a double air distillation column according to the invention and FIG. 2 is a graph depicting the variation in pressure drop and height per transfer unit for columns according to the prior art and a column according to the invention.

The double air distillation column 1 depicted in the drawing, with a vertical central axis X-X, is of conventional design apart from the construction of its packings. Thus it is made up of a medium-pressure column 2 surmounted by a low-pressure column 3. A main vaporizer-condenser V places the head vapor of column 2 (more or less pure nitrogen) in a heat-exchange relationship with the bottom liquid (more or less pure oxygen) of the column 3.

The column 2 comprises a top liquid distributor 4 and, under this, a single air distillation section 5.

The column 3 comprises: a top liquid distributor 6; an upper distillation section 9 situated between the distributor 6 and the feed 12; an intermediate distillation section 10 comprising at least 2 modules and at most 20 modules underneath the section 9; and a lower distillation section 11 comprising at least 2 modules and at most 20 modules and which is situated between the section 10 and the tapping 21. A distributor 7 separates the sections 9 and 10.

During operation, the air that is to be distilled, compressed to the medium pressure typically of the order of 5 bar absolute, is introduced into the bottom of the column 2. "Rich liquid" (oxygen-enriched air) collected at the bottom of this column is tapped off via a line 12, expanded to the low pressure which is of the order of 1.2 bar absolute in an expansion valve 13, and introduced into the column 3.

"Lean liquid" at the top of column 2, consisting of liquid nitrogen, is tapped off via a line 14, expanded to a low pressure in an expansion valve 15, and introduced into the distributor 6. The excess liquid nitrogen condensed in the vaporizer-condenser V drops into the distributor 4, which distributes it over the distillation section 5. In the latter, the incoming air ascends and exchanges heat and material with the liquid nitrogen in reflux and becomes progressively leaner in terms of oxygen content.

In the column 3, the ascending gas is gaseous oxygen, which exchanges heat and material with the reflux liquid. The distributor 6 distributes liquid nitrogen over the distillation section 9.

Each liquid distributor 4, 6, 7 has a peripheral trough 16 and several parallel troughs 17 of U-shaped cross section which open at each end into the trough 16. Between the troughs 16 there are parallel channels 18 for the passage of the ascending gas, these being closed off by a horizontal upper wall 19. Just underneath this wall there are rows of openings 20. The bottoms of the troughs 17 are perforated, thus defining a great many vertical jets of liquid under each of these troughs.

The double column 1 also comprises at least one product outlet such as a line 21 for tapping off gaseous oxygen from the bottom of the column 2, and situated just below the section 11, and a line 22 for tapping off residual gas (impure nitrogen) which leads out from the top of the column 3. The air inlet line in the bottom of the column 2 is labeled 23.

It may comprise an air inlet 25 and/or distributors between the sections 10 and 11 and/or below the portion 11A.

Each of the distillation sections 5, 9, 10, 11 consists of a stack of structured packing modules. The lower module constitutes the lower portion 9A, 10A, 11A of the section, while the other modules form the main portion of the section. The modules are stacked either directly on top of one another or with the interposition of elements that form spacer pieces.

Each lower portion 9A, 10A, 11A of the low-pressure column 3 consists of a packing module or "pack" more specifically designed to distribute the gas it receives from beneath uniformly over the entire cross section of the column while the modules of each other portion are more particularly designed to perform highly effective exchange of material and/or heat between this liquid and the ascending gas.

The following examples can thus be given:

(1) The lower portion 9A may be of the same kind as the other portion 9B but have a lower intrinsic density ($m^2$ of metal/m). The gas distribution function is thus performed at lower cost because the amount of metal used is smaller.

(2) The lower portion 10A may be of a different kind than the other portion 10B, namely may have a lower efficiency from a distillation standpoint and be less expensive. In particular, the lower portion may be of the cross-corrugated type, notably with a low density or a larger angle of inclination of the channels with respect to the horizontal, while the main portion 10B is more dense or has a lower angle of inclination of the channels.

(3) The lower portion 11A may be a packing module the height of which is shorter than that of the modules of the upper portions 11B. Thus, the height of the column is reduced without substantially penalizing the overall effectiveness of the distillation because the upper portion is not fully effective.

These various options can be combined with one another. In addition, in scenarios (1) and (2), the lower portion may be made up of more than one packing module.

The portions 9A, 10A and 11A may be replaced by another portion the number of transfer units of which is lower by modifying the portion in a different way described in this description.

In each of the above scenarios, the lower portion has, for each of its modules, a lower number of transfer units than each module of the other portion.

Specifically:

Scenario (1): Reducing the intrinsic density lowers the number of transfer units for a given height of the modules.

Scenario (2): By definition, the lower distillation effectiveness corresponds to a lower number of transfer units. For the same density, a packing the channels of which have a greater angle of inclination with respect to the horizontal has a lower number of transfer units.

Scenario (3): Reducing the height of a module reduces its number of transfer units.

Scenario (4): Dispensing with part of the active section of a module reduces its number of transfer units.

In the example depicted in the drawing, the upper portion of the distillation section of the medium-pressure column 2 is a single module of cross-corrugated packing in accordance with EP-A-1186843.

The upper portion 5A of the section 5 is discontinuous. It consists of several parallel strips each of which is situated below a corresponding trough 17 of the distributor 4. The other portion 5B is a main portion consisting of a stack of cross-corrugated packing modules. The modules in section 5 are angularly offset by 90° from one another about the axis X-X.

The portion 11B of the section 11 is a main portion consisting of a stack of cross-corrugated packing modules the density of which is higher than that of the lower portion 11A. The modules in the section 11 are angularly offset by 90° with respect to one another about the axis X-X. The portion 11B acts as a distributor so no other distributor is required between the sections 10 and 11.

The lower portion 10A of the section 10 is a main portion consisting of a stack of packing modules of the vented type. These modules are angularly offset by 90° with respect to one another about the axis X-X.

The upper portion 5B of the section 5 is discontinuous. It consists of several parallel strips each of which is situated below a corresponding trough 17 of the distributor 4. The lower portion 5A is a main portion consisting of a stack of cross-corrugated packing modules. The modules in section 5 are angularly offset by 90° from one another about the axis X-X.

It is also conceivable for the upper portion of a section to have a number of transfer units lower or higher than that of a portion of the section other than the lower portion. The upper portion may differ from said other portion other than the lower portion of the same exchange section in terms of at least one of the following factors:

its intrinsic density;

its structure;

the angle at which its channels are inclined with respect to the horizontal if the packing is a structured packing of the cross-corrugated type;

its mean density over the cross section of the column; and its height.

It will be appreciated that these choices of upper portion can be applied to columns other than those according to the invention.

It is often the case that when the number of superposed portions exceeds a given number, it is necessary to interpose a distributor to divide the portions into two sections in order to allow better distribution, as can be seen in respect of the sections 10 and 11 in EP-A-1186843, even when there is no fluid inlet between the two sections.

For the scenario depicted in the figure, it may be seen that, for two sections of five portions, all that is required is a reduction in the number of transfer units for the lower portion of the upper section in order to improve distribution. In this case there is then no need to fit a distributor between the two sections, and hence the height of the column can be reduced.

In FIG. 2, the graph shows the performance of the packings Test 1 and Test 2 according to the prior art. In these instances, each exchange section is made up only of portions that have the same number of transfer units, the portions in Test 1 having a higher number of transfer units than were used in the portions for Test 2. For Test 3, which corresponds to the invention, all the column section portions except for the lower portion had a number of transfer units identical to that used for the portions in Test 1. The lower portion had a number of transfer units lower than the number of upper portions, equal to the number of transfer units found in the portions for Test 2.

It may be pointed out that the height per transfer unit is substantially the same for the column with packing according to the invention (Test 3) and the column according to the prior art, Test 1. By contrast, the column for Test 2 can be seen to have a taller height.

For the column according to the invention, the pressure drops are always of the order of 10% lower than those of the column for Test 1, irrespective of the level of engorgement, hence giving a substantial energy saving.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A column with exchange packing for the exchange of heat and/or of material between a descending liquid and an ascending gas, of the type comprising: a first exchange section comprising a lower packing portion and an upper packing portion, wherein the lower packing portion of the exchange section comprises at least one packing modulate that has a lower number of transfer units than at least one packing modulate of the upper packing portion of the first exchanger section; wherein said packing module of said lower portion differs from said packing module of said upper portion of the first exchange section in terms of at least one of the following factors: an intrinsic density of said lower portion; a structure of said lower portion; an angle at which channels of said lower packing portion are inclined with respect to the horizontal when the packing is a structured packing of the cross-corrugated type; a mean density over a cross section of the column of said lower packing portion; and a height of said lower packing portion.

2. The column of claim 1, wherein said at least one exchange section is between two distributors.

3. The column of claim 1, wherein said at least one exchange section comprises no more than twenty portions that are superposed.

4. The column of claim 3, wherein said section portions are superimposed directly on one another.

5. The column of claim 1, wherein said factor is the mean density, and wherein said lower packing portion occupies only a fraction of the cross section of the column.

6. The column of claim 1, wherein said packing portions are portions of structured packing.

7. The column of claim 6, wherein said lower packing portion is a cross-corrugated packing portion, while the upper packing portion is a cross-corrugated packing portion of greater density.

8. The column of claim 1, wherein said lower packing portion consists of a single packing module.

9. The column of claim 8, wherein said single packing module is shorter in height than the packing modules of the other portion of the same exchange section.

10. The column of claim 1, wherein, in each exchange section the packing modules are stacked on top of one another, directly or with the interposition of elements that form spacer pieces.

11. The column of claim 1, wherein the column is a low-pressure column of a double air distillation column or an argon-enriched air gas mixture separation column.

12. The column of claim 1, further comprising a second exchange section, wherein the first exchange section and the second exchange section are disposed one on top of the other such that there is an upper exchange section and a lower exchange section, in which at least the upper exchange section has a lower packing portion comprising at least one packing module that has a lower number of transfer units than at least one packing module of the upper packing portion of the upper exchange section and a space defined between the upper exchange section and the lower exchange section, said space comprising an absence of a distributor, said space comprising an absence of a fluid inlet.

13. The column of claim 1, wherein the exchange section is contained between a fluid inlet or outlet and a liquid distributor.

14. The column of claim 1, wherein the exchange section is contained between a first fluid inlet or outlet and a second fluid inlet or outlet.

15. A method for separating an air gas using a column as claimed in claim 1, in which the column operates at a pressure of below 4 bar abs.

16. The method for separating an air gas as claimed in claim 15, in which the column operates at a pressure of below 2 bar abs and constitutes the low-pressure column of a double column or an argon separation column fed with a flow of argon-enriched air gas.

* * * * *